United States Patent Office 3,053,676
Patented Sept. 11, 1962

3,053,676
SURFACE COATING COMPOSITIONS
William Edward Higbee, 63 E. Division St., Chicago, Ill.
No Drawing. Filed Mar. 31, 1958, Ser. No. 724,806
8 Claims. (Cl. 106—148)

This invention relates to novel colored coating compositions having especial applicability to such porous or semi-porous surfaces as paper, paperboard, wood, fabrics and the like. More particularly the invention discloses a method for producing bi- or poly-tonal surface coatings wherein at least one constituent comprises a definite spectral color which may be highly saturated but of comparatively low brilliance while at least one other constituent is a metallic pigment low in saturation but high in brilliance, which affords to the coating a specular or mirror-like appearance.

The coating compositions herein described have the property of affording to the surface of the product coated therewith a beautiful, colored appearance quite unlike anything heretofore available in the surface coating field. Not only do they confer to the surface on which they are placed a solid or background color derived from the use of dyes or pigments of types normally used for such purposes but also impart thereto, superimposed upon the background color, an asterated or starlike appearance whose elements are more brilliant than the background, through use of certain types of metallic pigments such as aluminum and copper.

These coating compositions may be applied to the surfaces of boxes, labels, packages, bags, window shades, plastic coated wall coverings or luggage, wallpaper, curtains, dress goods, toys and, indeed, upon the surface of any object which is required to exhibit decorative qualities and which is sufficiently absorptive to receive and retain the same.

Surfaces coated in accordance herewith manifest much more life and brilliance than similar surfaces, bearing coatings colored monotonally. Such polytonal coatings as are here described, likewise show a depth and richness of appearance entirely absent from the monotonous, uniformly specular hue of conventional colored metallic coatings or coated foils.

Through application of the coating compositions hereinafter described relatively inexpensive materials may be vastly enhanced in their appearance without being excessively increased in cost.

It is an object of the invention, therefore, to provide colored surface coatings for paper products, textiles, and the like which have a starlike or asterated appearance, superimposed upon a solid spectral hue. Another object is to provide a coating composition for the surfaces of such products which affords a certain degree of specular or mirror-like appearance, while retaining the richness of the solid spectral hue.

Still other objects of the invention include provision for coatings which manifest a uniformly colored appearance when viewed from various angles and from some distance but which when viewed minutely may be observed to consist of many small discrete areas having distinct, specular hues disposed upon a solid background color. These and additional objects and advantages will be apparent from the ensuing detailed description of the invention.

It has been found that a polyhued coating in accordance with the present invention may be applied in a single operation to the surfaces of any material or product suitable for coating, by treating the same with a solution containing at least two different types of pigments of the classes hereinafter described. One of the pigment classes employed is that which can be dissolved or dispersed uniformly in water and which, after the coating is dried or set upon the surface, would by itself afford a solid and monotonal color thereto. The other class of pigments include those lamellar metallic materials which separate at least in part from and collect in the surface of the film during its drying or setting stage, but which, at least in the ratios employed in accordance herewith, do not preempt the surface but instead collect as small, brilliant, discrete, visible areas against a differently colored background.

Those pigments affording the monotone or base color may be designated herein as class II pigments and include, for example, parachlor red, dinitraniline orange toner, Hansa yellow, phthalocyanine green, phthalocyanine blue, alizarine red, titanium dioxide, carbon black, etc. That group of pigments of controlled aggregative tendency which provide the vivid, asterated, specular effect seen against the colored background may be termed class I pigments.

The preferred pigments of class I are selected from the "bronze pigments" of commerce by principles and criteria shown in detail later in this specification and include particularly certain grades of polished and unpolished powders of aluminum and copper as the most important because of the silver and gold specular effect which these contribute to the dried or set coating.

The ratios of class I to class II pigment in the coating compositions of the present invention and the amounts of these relative to the amount of the other components of the dried coating must be controlled to produce the polytonal surface effects herein described. The details of such proportions will be defined hereinafter in detail.

The coating compositions of the present invention preferably comprise a liquid dispersion medium (for which water at least in major proportion is preferred), a film-forming binder dissolved or dispersed in the medium; a selection of class I and class II pigments in relative and absolute amounts suitable to provide the shade and surface effect required; an extender such as a clay if necessary; dispersing agent for the pigments and extender; subsidiary compounding agents such as stabilizers, thickeners and the like.

The selection of film-forming binder is not critical to the development of the polyhued surface effects of this invention and film formers which are soluble or dispersible in water can usually be selected on the basis of their functional qualities as coating materials; for example, gloss, hardness, adhesion, flexibility, and the like. Care should be exercised, however, in use of film-forming materials or other products which contribute a high degree of acidity or alkalinity to the dispersion medium and most specifically with those products which confer upon the medium a pH below about 4 or above about 9 since rather rather rapid chemical reaction can ensue under these conditions between water and metallic powders. This, of course, is undesirable, and materials which inhibit such a reaction may be employed.

Whenever a film-forming binder of normally highly acid or alkaline condition is used for these coatings, e.g., neoprene latex which may have a pH as high as 12.4, it is preferred to buffer or adjust the pH of the finished compound whenever possible to between 4.5 and 9.5.

Among the binders which may be employed in accordance herewith are film-forming organic polymers, copolymers and interpolymers colloidally dispersed in water; emulsions of polymers or of materials which can be polymerized after deposition on a surface to form films; film-forming materials which are soluble in water or can easily be rendered soluble therein; and materials which are soluble in water and which can readily be caused to polymerize after deposition upon the surface.

Examples of colloidal polymeric film formers which can be successfully employed as binders include the polymer latexes produced from vinyl acetate, vinyl chloride, styrene, butadiene, acrylate and methacrylate esters; their copolymers and interpolymers with themselves and with other monomers such as vinylidine chloride, butyl maleate, vinyl pyridine, and the like. Typical examples of emulsions which are suitable as binders include emulsions of such products as polyvinyl acetate and oil based polyamides which are of too coarse average particle size to be classed as latexes as well as emulsions of unsaturated oils or resinous materials which can easily be converted, by the agency of oxygen or catalyst, to a film. Suitable examples of water soluble binders include: starch and animal glues; casein and other vegetable proteins such as alpha protein and zein rendered soluble by the use of alkalies, surfactants, urea and urea derivatives or the like, vegetable and synthetic gums such as gum arabic, methyl cellulose, polyvinyl alcohol and the like. Examples of materials which are soluble or dispersible in water and can be polymerized to films when in place upon a surface include dimethylol urea and those pre or partially polymerized substances which can be converted into urea-formaldehyde, melamine formaldehyde, and phenolic formaldehyde resins.

Those pigments of class I and class II types, as well as extender when employed, should preferably be dispersed in water before adding them to the coating composition. Those dispersing agents preferred are selected from well-known types in accordance with known qualities conferred by them upon water dispersions. For example, inorganic extenders and pigments such as clay, calcium carbonates and titanium dioxide may be dispersed by grinding in a water medium in the presence of one of the complex phosphates, such as Victamide, or one of such proprietary materials as Daxad 11, Blancol and the like and comprising salts of alkyl naphthalene sulfonic acids condensed with formaldehyde.

Organic pigments and colors employed herein are preferably dispersed in the composition by first grinding the same in the presence of water and a surfactant preferably of the lipophylic type, for example, an alkylphenyl polyethylene glycol ether such as Tergitol NP–14, manufactured by Carbide & Carbon Chemical Company (Division of Union Carbide Corp.).

Grinding is not necessary during the dispersion of class I pigments which may be satisfactorily dispersed by merely mixing with water and a dispersing agent selected from the types preferred for either inorganic or organic pigments. Mildly alkaline solutions of protective colloids, such as casein or alpha protein, are also effective dispersing agents for class I powders and are particularly useful since these may be employed as part or all of the film-forming ingredient of the coating composition.

Examples of several coating compositions prepared in accordance with this invention are hereinafter set forth and their application to various surfaces described. It should be understood that these coatings may be applied to a wide variety of different surfaces, under divers conditions and by many types of machinery and may manifest diverse performance qualities. The principles affecting selection of a film-forming binder and modifying agents to assure liquid and film properties practical for proper performance during application of the coating and later use of the product are not, per se, critical to the production of the asterated, multicolored surface effects herein described. For example, an alkaline solution of casein or alpha protein may be selected as binder of a coating to be applied to paper labels or wallpaper; a latex in which the polymer phase is polyvinyl acetate, polyvinyl acetate copolymer, butadiene-styrene, polyacrylate or the like, alone or mixed with a protein or starch or similar solution, may be chosen as the binder for coatings to be applied to bags or packages which require a good deal of flexibility, toughness and water resistance; neoprene, butadiene-acrylonitrile or natural rubber latexes may be preferred as the binder in coatings for leather, artificial leather or fabrics intended for use as upholstery and luggage goods, sodium or potassium silicates may be preferred as the binder for colored coatings to be applied to asbestos shingles and then baked in production of semivitreous roofing material. However, to insure the production of the polytonal, starlike surface effects of this invention throughout the wide potential variety of water based coatings above described, it is necessary to restrict the weight ratio of class I pigment to dry binder and of class I pigment to class II pigment in the coating composition to within certain limits.

These restrictions are necessary because of the differing conducts of the two classes of pigment in the wet film after application to the surface but before this has dried or set.

Class I pigments, because of their high surface contact angle and lamellar particle shape, "leaf" in a water medium; that is tend to collect in or at the surface with the plane of their individual flakes oriented parallel to that surface. However, because of the restricted grease content of such pigments, at low and medium concentrations, they also tend to collect in small spots and islands, in or at the surface, which spots or islands give rise to the asterated effect seen in the dry film. Even low concentrations in the order of 1–2% based on the weight of dry film-forming binder of such type I pigments as Alcoa #524 aluminum pigment, manufactured by Aluminum Company of America, contribute a decidedly asterated appearance to the coating.

As the amount of type I pigment increases in proportion to the amount of dry binder, the spots or islands become more numerous. As ratio is further increased, the spots or islands finally touch and, in the absence of colored class II pigment, an all-over metallic surface appearance results.

Metallic pigments having a smaller particle size or a higher grease content than the class I pigments of the type herein contemplated do not collect in brilliant but still discrete and well dispersed spots or islands when the concentration is low relative to the amount of dry binder. At such concentrations these pigments do not provide the asterated effect desired.

At the concentration of minimum coverage, that is where the spots or islands touch, such small sized or relatively greasy particles provide a uniform metallic effect which, however, striking in itself, is not the appearance produced by the coating compounds of this invention. While class II pigment can be added to compounds made with small particle size or relatively greasy pigments the final effect is dull and uninteresting.

The relatively coarse and low grease content particles of type I pigment do not leaf completely. That is, only a fraction of these particles are positioned in the dry film with their planes parallel to the film surface. A coating produced from such pigment at a ratio between it and dry binder at or above minimum coverage is relatively rough, containing many points of twinkling light resulting from leafed particles, separated by duller areas in which the particles are not properly leafed.

Class II pigments fill in the surface area between the spots and islands of specular pigment. When the concentration of class I pigment is above that of minimum coverage, class II pigment fills in the darker hollows around the higher and better leafed, brilliant spots. In both cases the eye is presented with a background color on which is superimposed the bright and twinkling appearance of randomly disposed small areas of class I pigment.

With given class I and class II pigments and with a particular binder and substrate, the shade or hue produced is obviously greatly affected by the ratio between amounts of class I and class II pigments employed. A low ratio of class II relative to class I pigment produces a hue largely specular which is tinted with spectral color;

a high ratio of class II to class I pigment produces a surface appearance largely spectral enlivened with some specular character.

In practice the total coverage or total hiding power of the compound containing both pigments is important. For example, when a dark colored substrate such as natural kraft paper is to be coated, the hiding power must be greater than that required on a white clay coated sheet of bleached sulfite. Since class I pigment is much more opaque than class II pigment in the same amounts, the hiding power of any given coating compound is largely a function of the ratio of class I pigment to total dry binder. In some cases it may be desirable to employ relatively low ratios of class I and class II pigment based on the total dry binder thus obtaining a relatively transparent coating. This particularly is true in respect to gold shades. In other cases it may be desirable to use fairly high ratios of class I and class II pigments relative to dry binder so as to obtain a more opaque coating.

Although all class I pigments are highly opaque, class II pigments vary enormously in the opacity of films produced with given amounts of each. For example, yellow pigments are usually of low hiding power; phthalocyanine blue pigments of high hiding power. With a given ratio of a particular class I pigment to a particular dry binder it will be necessary to use much more yellow pigment than blue pigment to obtain a relatively equal depth of shade. It is, therefore, impractical to circumscribe and define limits and ratios of class II pigments generally to class I pigments. However, since class I pigment concentration relative to dry binder is the dominant effect in producing opacity in the coating, a practical lower limit for aluminum pigments can be stated as one part class I aluminum pigment per 100 parts dry binder. A practical upper limit would be 100 parts class I aluminum pigment per 100 parts dry binder.

These limits will naturally vary when class I pigments are chosen from other materials than aluminum. For example, copper or bronze powders, being of higher gravity than aluminum, contain fewer particles in any given weight. Practical limits for a typical copper base class I pigment could, therefore, be taken at 2 parts copper per 100 of dry binder as a minimum and 150 parts per 100 dry binder as a maximum.

These coating compositions may be applied to the surfaces of paper products, fabrics, plastics, leather, wood, metal and the like by any of a number of methods known to those skilled in the art. These specific means by which application is effected is not part of the present invention. Whatever method of application may be employed, however, including the use of wire wound coating bars, roll and knife coaters, spray guns, dipping and roller or brush painting methods and the like, requires formulation to obtain suitable viscosity and flow properties by methods known to those skilled in the art of formulating water base coatings.

Although the coatings of the present invention may be imparted to almost any surface in a single operation, it is sometimes desirable to apply first to the surface a base or prime coating and then to apply the starlike coating composition upon this. This prime coating may be of natural color or it may be colored with either type I or type II pigments or with a combination of both. A practical advantage of applying a colored base coat which is the same or at least approximates the dominant hue of the starlike coating to be applied later, is that irregularities in application of the top coat, produced by machinery such as a brush or knife coater, are ordinarily less visible. On the other hand, striking effects may be produced by applying a base coat of entirely different hue or opacity or both and then overlaying this with a second starlike coating formulation produced in accordance with the principles herein stated. A prime or size coat may also have the function of unifying the surface, that is of making the surface smooth and of even absorbency.

It has been found that when a coating composition containing type I and II pigments and a binder in a water dispersion is placed upon the surface of an absorbent substrate, such as blotting paper, there is a pronounced tendency for the components dispersed molecularly or in small particles to sink below the surface whereas those components dispersed in relatively coarse particles (such as type I pigment) tend to accumulate on the surface. Applied to such a surface the type I pigment tends to collect in relatively coarse and unsightly patches.

On the other hand, a relatively hard, even, non-absorbent substrate such as cellophane or glassine paper, when coated with a similar composition, manifests a uniformly colored surface in which the type I pigment shows only as very minute twinkling bright point whose diameter is at or close to the resolution of the eye.

A substrate such as low cost southern kraft bag or liner stock is comprised of unevenly oriented fibre bunches and is, therefore, full of so-called hard and soft spots, that is spots of low absorbency intermingled with spots of high absorbency. The same coating compound applied to such a surface will show an uneven texture since the liquid appears to be sucked down into the softer spots and consequently to be starved with type II pigment at such points. If such an uneven surface be properly primed or sized before the colored coating is applied a much more even and uniform surface effect will be obtained.

Class I pigments as herein defined comprise a limited group of metallic powders falling within the more broadly defined class of commercial pigments called "bronze powders" by Matiello in his "Protective and Decorative Coatings," edition 1947, volume 2, page 585, lines 16–19.

This text gives manufacturing details for the production of "bronze powders" from aluminum, copper alloys, and other metals which, in general, involves converting the finely divided metal to a lamellar particle shape by repeated impact in a stamp mill, ball mill or the like in the presence of a small amount of polar, greasy material such as stearic or oleic acid and often in the presence of solvents such as mineral spirits. After the solvent, if any, is evaporated the so-called "unpolished" powder is then usually polished by the action of brushes rotating within a drum and in the presence of more of the greasy lubricant.

Pigment grades of differing average particle sizes are produced through variance in the original milling or stamping time, longer processing periods resulting in smaller average particle size distributions. Two grades of such pigments are generally recognized commercially. These are the so-called "leafing" powders which are employed in the production of bright metallic finishes from lacquer or varnish vehicles and "litho" or "non-leafing" grades which do not leaf in varnishes or lacquers.

A "leafing" powder is commonly understood to mean one which when dispersed within or dropped upon the surface of a varnish or lacquer vehicle immediately forms a mirror-like metallic surface thereon as a result of repellence of a significant amount of the pigment by the vehicle and the consequent displacement of the pigment towards and into the surface.

Although both "leafing" and "non-leafing" grades are made in various types of differing average particle size distribution, they differ essentially in the amount and kind of greasy lubricant employed during their manufacture and retained upon their surfaces. The "leafing" grades are commonly made with stearic acid as a lubricant and commonly contain 3–5% of this material based on the total weight of the pigment. The "non-leafing" grades are "drier," that is contain a smaller amount of lubricant, in the order of magnitude of 1–1.5% and this may be of a different type than stearic acid. Unpolished powders contain even less grease, in the order of magnitude of ½–1%.

All of these types and grades leaf in or upon water because of the very high surface tension of this medium as compared with varnishes or lacquers. However, to produce the starlike or asterated effects of my invention, I have found it necessary to employ only the dry or "non-leafing" grades of such pigment and have found particularly useful the driest or lowest grease content powders, such as unpolished aluminum powder, which are not normally considered pigments at all. True "leafing" powders cannot be employed in the practice of this invention because these materials with their heavy coating of grease on the surface of each particle have such a high contact angle towards water and consequently are repelled so strongly thereby that they preempt the surface even in very low concentrations and, if unable to completely cover it, aggregate in large and unsightly metallic blotches. On the other hand, neither can there be employed in accordance herewith metallic powders such as atomized powders, whose particles are of non-lamellar shape or whose particle surfaces are not greasy and are of low contact angle or both since such powders do not contribute any specular appearance to areas in the surface.

Class I pigment, in addition to being limited in grease content and contact angle, must also be chosen from those pigments having a relatively large particle size. For example, Alcoa #552 standard litho powder is a polished aluminum pigment of grease content below 1.5% but of quite small particle size resulting from extended milling treatment. Asterated effects can be produced from coatings comprising this pigment together with suitable binders and class II pigments within the proportions previously stated. However, the effects produced are dull and uninteresting as discussed above.

On the other hand, a coating made within the above proportion of binder, class II pigment and Alcoa's #524, a polished aluminum powder of low grease content having a maximum particle size of about 40 microns, shows brilliant, asterated surfaces. A further step in surface brilliance can be obtained by substituting an unpolished aluminum powder of low grease content, Alcoa #606, as the class I pigment in the above examples.

Polished metallic powders of fine particle size are normally considered best for making metallic coatings since they give maximum coverage and the most even, foil-like appearance. However, pigments of exactly the reverse qualities, namely, coarse and unpolished powders give the most brilliant effects when used within the formulative restrictions above stated.

The available metallic pigments of commerce are composed of particles of a wide range of sizes. I have found that the coarse fraction in a typical pigment such as Alcoa #524 provides the most brilliant surface effect whereas the finer particles have little value in producing this effect. A sample of standard Alcoa #524 powder was screened through a 325 mesh screen and separated into two fractions, a coarse fraction and a fine fraction. Coating compounds were then made using the formula of Example 3 shown later in this specification. In one experiment the class I pigment used was the coarse fraction; in the second experiment the fine fraction was used. Dried coatings made from these two experiments showed, in the case of that employing the coarse fraction, a very brilliant and asterated effect. In contrast to this desired effect the coating from the compound using the fine fraction was dull and relatively uninteresting.

I have found that the limit of average metallic particle size defining a suitable class I pigment lies between Alcoa 524 and Alcoa 552 powders, the former having large enough flakes to provide a brilliant appearance whereas the latter has flakes which are so small as to prevent the production of a highly brilliant surface. An index of average particle size and of suitability for the purposes of my invention is the "equivalent covering power on water" of the powder.

Metallic pigments of the "leafing" types, that is, those of high grease content, show such high contact angles in contact with water that they will leaf completely when spread in a thin layer upon a clean water surface. When a definite quantity of such powder is spread upon a clean water surface it is possible by means of movable barriers to spread the metallic film out upon the water surface until it is only one flake thick. By this means the maximum area covered by a given unit weight of the powder can be determined. Different milling conditions providing different average particle sizes and particle distributions, vary this maximum covering power, the smaller particle size finer powders having the larger covering power.

While the so-called non-leafing or dry powders which are preferred for my invention do not completely float upon a water surface because of their lower contact angle towards water, an "equivalent covering power" can be taken on the basis of equivalent milling times for the dry powder as compared with a greasy product. Since the extra grease content of a greasy powder is added after the particles have been formed during the milling procedure the average particle size and particle distribution of a greasy and a dry powder made by the same milling procedure should be substantially the same. The ascertainable covering power of the former on water can, therefore, be projected to the unascertainable equivalent covering power of the latter. The equivalent covering powers on water for the Alcoa 524 and 552 powders are approximately 10,000 sq. cms. per gram and 18,000 sq. cms. per gram, respectively. As pointed out above, the limit of average metallic particle size lies between the particle sizes of these powders. I prefer to define class I pigments as those milled powders of grease content below about 1.5% and of equivalent average covering power on water of less than about 15,000 sq. cms. per gram.

In summary, class I pigments comprise those finely divided solid materials of lamellar shape and high opacity, having an equivalent average covering power on water of less than about 15,000 sq. cms. per gram and average particle size greater than about 5 microns, medium or high contact angle towards water, but whose grease or lubricant content is less than about 1.5% based on the total weight of the pigment.

Class II pigments include the conventional, substantially, water-insoluble pigments of commerce, comprising highly opaque and colored materials of average primary particle diameter of less than 2 microns. While the substantially water-insoluble pigments are preferred because of their greater hiding power, water-soluble and solvent-soluble dyes may also be employed as the class II color.

While accurate particle size averages and frequencies are seldom available for any particular pigment, there is general agreement upon the range within which most commercial products are produced and which leads to the most efficient use of the pigment. For example, if a highly colored and opaque material (including white and black as colors), distributed in a medium or in a dry film, has particles which are too coarse, it will be relatively inefficient as a hiding and coloring material. On the other hand, if the same product is present as particles which are too fine, it will display color but an undesirable degree of translucency.

In general, a good pigment of class II as herein employed will contain materials in the range of 0.2 micron to perhaps 1 or 2 microns.

Most of the available colored pigments (with the exception of certain naturally coarse and relatively inefficient materials, such as ultramarine blue), and also the white pigments, such as titanium dioxide, in their commercial forms, fall within the above range.

There is, however, one group of commercially available pigments of much finer average particle size than this. These are the black pigments which, in the case of the finest carbon blacks, are produced as primary particles averaging as low as 25 to 65 millimicrons in diameter.

Dyes are similar to pigments in that they comprise highly colored chemical structures. Instead of comprising microscopic or colloidal aggregates, as is the case with pigments, dyes are of molecular dimensions. As would be expected, the hiding power of films or coatings colored with dyes is much less than that where pigments are employed, but certain novel effects such as increased brilliance can often be attained by the use of dyes.

I have formulated satisfactory star like colored coatings with a great variety of different dyes and pigments and have found the chemical composition of these to be unimportant, provided they fall below a certain particle size limit, which I have taken as 2 microns maximum average diameter. Also, of course, as is done in conventional practice, dyes and pigments which contain soluble ingredients, contaminants, or extenders which interfere with stability or film formation in the coating compound should be avoided.

It is much more difficult to fix limiting proportions of class II pigment relative to the amount of class I pigment or to the amount of dry film-forming binder within which satisfactory polyhued coatings can be produced in accordance with this invention. As stated before, the class II pigment fills in the surface spaces between the spots or islands of class I pigment and thereby provides a solid monotonal view of the background. However, color is a psychophysical effect, and the practical production of starlike asterated coatings in accordance with this invention is believed to require that the amount of class II pigment employed shall not be so small as to be lost in the eye when viewed in comparison with the class I pigment used and also that it not be in such large proportion as to smother or dominate the total color of the polyhued surface. A further difficulty arises, since, although the individual plate-like particles of class I pigment are almost completely opaque, a layer of class II pigment of equal thickness would vary from almost complete transparency in the case of dyes to fairly high opacity in the case of titanium dioxide and the iron oxide pigments.

It must, therefore, be left to the formulator skilled in the art of producing colored coatings to first adjust the radio of class I pigment to dry film former for production of the proper degree of asteration and on this basis to add sufficient class II pigment to give the desired overall colored effect.

It has been previously noted that for transparent or translucent effects the ratio of class I pigment to dry binder will be kept relatively low but in any case above the minimum ratio of 1 part aluminum pigment per 100 parts binder on the equivalent minimum ratio when other metals are used. For opaque coatings, higher ratios of class I pigment such as aluminum pigment up to the range of 100 parts per 100 parts dry binder may be employed or the equivalent in pigments of different specific gravity. However, in any case the formulation will restrict the total of class I and class II pigments to that amount which can be satisfactorily bound by the dry binder.

For the purpose of increasing the opacity of the coating, metallic powders having an average particle size which is less than the minimum given for a class I pigment may be employed in small amounts. Such fine metallic powders do not contribute appreciable brilliance and thus cannot be substituted for the class I pigment; however, in reasonable amounts the fine powders do not detract from the brilliance imparted by the class I pigment.

Following are detailed resumes of the preparation and application of several coating compositions of the present invention. It is to be understood that these examples are not intended as limitations upon the invention and that they are presented for illustrative purposes only.

The ingredients of each example are first listed in regard to both type and amount; the procedure for mixing is then given; the appearance of the coated product is stated; and finally definitions and descriptions of various ingredients are presented as necessary.

*Example 1*

| | Parts by weight |
|---|---|
| (1) Water | 135.64 |
| (2) Casein solution | 273.26 |
| (3) Aluminum powder | 14.70 |
| (4) PVAc latex | 90.40 |
| (5) Dispersion of ball milled blue pigment (25% pigment solids) | 14.40 |

Items 2–5, inclusive, were added separately and in that order to item 1 with stirring, being careful to incorporate each item completely before adding the rest.

The casein solution was made by slurrying 100 grams of 30 mesh casein with 492 grams of water at 120–130° F. for five minutes, followed by addition of 7 grams of borax and 4 grams of 26° Bé. ammonia. Stirring was continued until the casein had completely dissolved, or for about one-half hour.

The aluminum powder used was a ball-milled but unpolished powder sold by the Central Solvents & Chemicals Company, under the designation of "Starlite Pigment #3." Its grease content is in the range ½-1%, less than 0.2% of the powder is retained on a 100 mesh screen while 90% will pass through a 325 mesh screen.

The PVAc latex was a colloidal dispersion in water of the interpolymer of vinyl acetate and butylmaleate or butylfumarate, sold by Celanese Corporation of America, and containing 55% ±1% of total solids.

The blue pigment dispersion was made by ball milling a charge consisting of 25 grams copper phthalocyanine pigment, 1 gram of Tergitol NP–14 (whose composition has been previously given), 33 grams of a 3% water solution of 4000 cps. methyl cellulose, and 41 grams of water for 48 hours. A commercial product suitable for the purpose is Imperial Paper and Color Company's "Imperse Blue X–2446."

The resulting coating composition was spread on a web of white, uncoated sulfite paper weighing 46 pounds per ream, 25 x 38–500, by a brush coating machine, 50 inches wide, operating at about 150 feet per minute and dried in a festoon drier operating at an average temperature of 175° F. The coated sheet had a brilliant, deep-blue finish showing a multiplicity of silvery starlike specks throughout.

*Example 2*

As in the case of Example 1, items 2–5, inclusive, of the following formula were added, individually and with stirring to assure incorporation of each, to item 1:

| | Parts by weight |
|---|---|
| (1) Water | 135.00 |
| (2) Casein solution (as in Ex. 1) | 271.74 |
| (3) Aluminum powder | 15.00 |
| (4) Polyvinyl acetate latex | 90.92 |
| (5) Parachloro red dispersion (25% of pigment solids) | 18.00 |
| (6) Formaldehyde solution | 7.50 |

The aluminum powder was a ball milled and polished powder sold by Central Solvents and Chemicals Company under the designation "Starlite Pigment #1." Its grease content is in the range of 1–1½%; less than 2% is retained on a 100 mesh screen while 90% will pass through a 325 mesh screen; it has a theoretical covering power on water of less than 10,000 cm. per gram, indicating a maximum particle size of about 40 microns.

The formaldehyde solution was prepared by diluting 1 part of commercial formaldehyde with 7 parts of water.

A suitable commercial pigment dispersion is Imperse Red X–2683, sold by Imperial Paper and Color Company.

The resulting composition was applied to a sheet of 60 pound bleached kraft paper of good formation and level surface with a No. 18 Mayer type, wire-wound coating bar and dried in a hot-air oven operating at 220–230° F. for 5 minutes.

The coated paper produced thereby was similar to that prepared in accordance with Example 1 except that, instead of blue, the background was deep red with an orange cast. The surface showed a starlike, brilliantly asterated appearance.

*Examples 3–9*

In a series of compositions, prepared like those described in Example 2, the following class II dispersions, were substituted for the Parachlore Red dispersion employed therein and sheets of 51 pounds CIS sulfite litho paper were coated with the resulting compositions using the same coating and drying means as in Example 2. The following table sets forth the class II color employed and the amount.

| Color dispersion: | Amount used |
|---|---|
| Dinitraniline Toner (25% pigment solids) | 21 |
| Hansa Yellow 10G (25% pigment solids) | 51 |
| Phthalocyanine green (25% pigment solids) | 10 |
| Phthalocyanine blue (25% pigment solids) | 6 |
| Alizarine red (25% pigment solids) | 9 |
| Lamp black | 20 |
| Titanium dioxide (50% of pigment solids) | 100 |

Suitable dispersions of each of the above colors, except titanium dioxide, the last, may be produced in the same manner that dispersions of copper phthalocyanine blue pigment were made in Example 1.

Appropriate commercial products which may be employed in place of the given color dispersions are in order: Imperse Orange X-2457, Imperse Yellow X-2685, Imperse Green X-2454, Imperse Blue X-2446, Imperse Madder Lake X-2518, Imperse Black X-2495, all sold by Imperial Color and Chemical Corporation.

Inspection of the sheets coated by the methods and formulas of Examples 2–9 inclusive disclosed a range of background colors which substantially covers the visible spectrum. The basic hue of such sheets varied from red, through orange, copper, yellow-green, green-blue, purple, grey and black.

The chemical nature of the various colors named above is, of course, not part of the present invention. For data concerning them most organic chemistry texts will be helpful but the text "Protective and Decorative Coatings," Matiello, edition 1947, John Wiley & Sons, is particularly useful in respect thereof.

*Example 10*

| | Parts by weight |
|---|---|
| (1) Water | 100 |
| (2) Alpha protein solution | 630 |
| (3) Aluminum powder (per Example 1) | 1 |
| (4) Phthalocyanine green dispersion (per Ex. 5) | 2 |

Items 2–4, inclusive, were added, separately and in that order, to item 1 with stirring, care being taken to incorporate each completely before adding to rest.

The resulting liquid compound was spread as a sheet of 51 pound, 25 x 38–500, white CIS (i.e., coated one side with standard clay casein coating) sulfite paper. The coated sheet was then dried for five minutes in an air oven operating at about 220° F. to 230° F.

The coated sheet exhibited a brilliant and sparkling pale green color.

The alpha protein used was a purified grade of isolated soya protein produced through solvent extraction by the Glidden Company. The protein solution was prepared by slurrying 100 grams of high viscosity type alpha protein in 520 grams of water at 130–140° F. for 5 minutes. 10 grams of 26° Bé. ammonia were then added and the mixture stirred until the protein dissolved.

*Example 11*

| | Parts by weight |
|---|---|
| (1) Water | 100.00 |
| (2) Starch solution | 500.00 |
| (3) Butadiene-styrene latex | 52.08 |
| (4) Aluminum powder (per Ex. 2) | 50.00 |
| (5) Madder Lake dispersion (per Ex. 7) | 60.00 |

The starch employed was a high viscosity oxidized paper coating grade of corn starch. The starch solution was prepared by slurrying 15 grams of starch with 100 grams cold water, raising the temperature to 190–195° F. while stirring, and cooking at such temperature for 15 minutes.

The butadiene-styrene latex employed was a colloidal dispersion in water of a copolymer of butadiene and styrene comprising these monomers approximately in the ratio of 60 to 40. That product of Dow Chemical Company called Dow Latex 512–R, containing 48% solids, has been found useful.

The coating compound was spread on a sheet of 70 pound, 24 x 56–500, calendered, natural kraft paper by means of a Bird coating bar set at 0.006 inch and dried for 5 minutes in an air oven at 220–230° F. The coated product had a very deep but brilliant and sparkling purple hue.

*Example 12*

Part A:

| | Parts by weight |
|---|---|
| (1) Neoprene Latex 842–A | 198.02 |
| (2) Casein solution | 28.02 |
| (3) Sodium silicate | .66 |
| (4) Igepal CO–630 | .25 |
| (5) Zinc oxide dispersion | 10.00 |
| (6) Sulfur dispersion | 1.66 |
| (7) Agerite powder dispersion | 2.50 |
| (8) Ethyl zimate dispersion | 4.00 |

Items 2, 3, 4 were mixed and added to item 1 with stirring. Then items 5–8 inclusive were added, separately and in that order, with stirring, care being taken to incorporate each item thoroughly before adding the rest.

Part B:

| | Parts by weight |
|---|---|
| (1) Water | 30.00 |
| (2) Casein solution | 16.3 |
| (3) Aluminum powder (per Ex. 2) | 15.00 |
| (4) Phthalocyanine blue dispersion | 12.00 |

Items 2, 3 and 4 were added separately to item 1 with stirring, care being taken to incorporate each fully before adding the rest.

Finally part B was added to part A with stirring.

This compound was sprayed on 12 oz. cotton duck with a Binks spray gun using about 15 pounds air pressure. The compound was diluted with about 10–15 percent of water before spraying and two coats were applied. After drying in an air oven at 220–230° F. the coated fabric was cured for 25–20 minutes at 250° F. The coated fabric was tough, strong, resilient and showed a beautiful blue color distinguished by many randomly distributed silvery spots.

Neoprene latex 842A is a colloidal water dispersion of polychloroprene, approximately 50% solids, stabilized with a rosin soap, which is sold by the Du Pont Company.

Igepal CO–630, an alkyl phenoxy polyethylene ethanol, is a product of Antara Chemical Company. This, together with the casein and the silicate, acts as stabilizer for the latex.

Ethyl Zimate, a commercial form of the zinc salt of diethyldithiocarbamic acid, is an ultra accelerator sold as a 50% solids dispersion by R. T. Vanderbilt Company. This company also provides a suitable commercial grade of sulfur dispersion 67% solids and of zinc oxide dispersion 50% solids. Alternatively, these three chemicals (which act together to cure or vulcanize the neoprene) may be dispersed by the methods employed for inorganic class II pigments.

The antioxidant AgeRite powder is a commercial form of phenyl betanapthylamine and is sold as a 40% solids dispersion by R. T. Vanderbilt Company.

*Example 13*

| | Parts by weight |
|---|---|
| (1) Water | 300.00 |
| (2) Pontamine Fast Yellow | 12.00 |
| (3) Pontamine Fast Orange | 1.00 |
| (4) Casein solution | 280.00 |
| (5) Aluminum powder | 37.50 |
| (6) Copper powder | 37.50 |
| (7) PVAc latex | 90.91 |
| (8) Formaldehyde solution | 25.00 |

Items 2–8, inclusive, were added separately and in that order to item 1 with stirring, being careful to incorporate each item completely before adding the rest.

Pontamine Fast Yellow and Pontamine Fast Orange are direct dyes produced by Du Pont Company.

Casein Solution, Aluminum Powder, Formaldehyde Solution and PVAc latex are as in Example 2.

The copper powder was a coarse non-leafing grade of bronze powder sold by Crescent Bronze Powder Company as #262 Richgold.

The resulting composition was applied to a sheet of 45 lb. MG sulfite paper with a #30 Mayer type wire wound coating bar and dried in a hot-air oven operating at 220–230° F. for 5 minutes.

The coated sheet had a rich, brilliant, yellow-gold appearance.

*Example 14*

| | Parts by weight |
|---|---|
| (1) Water | 100.00 |
| (2) Alpha protein solution | 307.00 |
| (3) Copper powder | 50.00 |
| (4) Pontamine Fast Rubin B | 5.00 |
| (5) PVAc latex | 90.91 |
| (6) Water | 100.00 |

Items 2–6, inclusive, were added separately and in that order to item 1 with stirring, being careful to incorporate each item completely before adding the next.

Pontamine Fast Rubin B is a direct red dye produced by Du Pont Company.

Alpha protein solution is made as described in Example 10.

Copper powder and PVAc latex are as in Example 13.

The resulting composition was spread on a sheet of 50 lb. EF sulfite paper with a #18 Mayer type wire wound bar and dried for 5 minutes in a hot-air oven operating at 220–230° F.

The coated sheet had a beautiful reddish-bronze appearance with many small brilliant, gold starry specks.

The polyvinyl acetate latex employed in accordance herewith may be prepared in any of the usual ways. The present invention does not reside in the method of manufacture of such emulsion or for that matter in any particular composition thereof. In addition to the emulsifier and accelerator which are usually present during the polymerization of vinyl acetate monomer and thereafter carried over into the finished product, there may, if desired, be a protective colloid in the emulsion such as a low viscosity hydroxethyl cellulose derivative. Other protective colloids which are not gelled or thrown out of solution by high concentration of inorganic salts may also be used.

A polyvinyl acetate emulsion having utility in accordance herewith may be prepared by emulsifying vinyl acetate with a small amount of one or more synthetic surface active materials, e.g., a combination of equal parts of alkyl polyethylene glycol (such as "Tergitol NP–14" manufactured by Carbide and Carbon Chemicals Co.) and dioctyl sodium sulfosuccinate (such as "Aerosol OT" manufactured by American Cyanamid Co.) and catalyzing the polymerization with a peroxide, e.g., hydrogen peroxide. There is also preferably present during the polymerization an accelerator such as a 10% solution of ferric chloride and a protective colloid, e.g., a hydroxethyl cellulose such as "Cellosize WP–40," a product of Carbide and Carbon Chemical Co. A typical polymerization reaction mixture consists of the following:

| | |
|---|---|
| Vinyl acetate | 39.0 |
| Butyl maleate | 13.0 |
| Protective colloid | 2.0 |
| Tergitol NP–14 | 1.5 |
| Aerosol OT | 1.5 |
| 28% solution of $H_2O_2$ | .3 |
| 10% solution of $FeCl_3$ | .005 |
| Water, sufficient to give final emulsion of 55% solids. | |

The polymerization itself may be carried out by charging the aqueous components and a portion of the monomers to a reaction vessel equipped with a reflex condenser, stirrer, and dropping funnel. Stirring is begun and the charge is then heated to reflect at which time the remainder of the monomers together with the catalyst is added at a uniform rate. Polymerization is complete in one to two hours after which the reaction mixture is cooled to room temperature, while continuing to stir. Any unreacted monomer may be stripped.

*Example 15*

| | Parts by weight |
|---|---|
| (1) Water | 120.00 |
| (2) Victamide solution, 25% solids | 3.20 |
| (3) Aluminum powder A | 20.00 |
| (4) Aluminum powder B | 20.00 |
| (5) DC Antifoam AF emulsion (1% solids) | 2.00 |
| (6) Pigment Green B pulp | 27.00 |
| (7) Polyvinyl chloride-copolymer latex | 176.90 |
| (8) Methyl cellulose solution (2.5% solids) | 10.00 |

Items 2–7, inclusive, were added separately and in that order to item 1 with stirring, being careful to incorporate each item completely before adding the next.

To illustrate the use of a complex phosphate for dispersing the aluminum pigments, a 25% solids Victamide solution was employed. Victamide is a product of Victor Chemical Works and is an ammonium salt of an amido-polyphosphate. The compound has a particle size of less than 5 microns and analyzes 76.1% $P_2O_5$, 22.4% total $NH_3$, 15.4% free $NH_3$, and 7.0% amide nitrogen as $NH_3$.

Aluminum powder A is a ball milled but unpolished powder sold by the Central Solvents & Chemicals Company under the designation "Starlite Pigment #3," and described in detail in Example 1.

Aluminum powder B is a ball milled and polished powder sold by the Central Solvents & Chemicals Company under the designation "Starlite Pigment #2." Its grease content is in the range 1–1½%; 98% will pass through a 325 mesh screen; its theoretical covering power on water is about 18,000 sq. cm. per gram. It is, therefore, too fine to be considered a class I pigment, and is used in this composition as an opacifier.

DC Antifoam AF is a silicone product sold by Dow-Corning Corporation as an emulsion of approximately 30% solids. This product was reduced to 1% solids for use in this example.

Pigment Green B was employed as the commercial pulp color of that name sold by Imperial Paper & Color Company.

As a hardenable, film-forming binder a suitable colloidal water dispersion of a copolymer of vinylchloride and one or more comonomers, such as vinylidenechloride, alkyl acrylates, vinyl acetate, and other copolymerizable monomers may be employed along with suitable plasticizers, such as dioctyl phthalate. One illustrative copolymer latex is Geon 576, a product of the B. F. Goodrich Chemical Co.

The methyl cellulose was a commercial product of 7000 cps. viscosity type, sold as Methocel 7000 cps. by Dow Chemical Company.

The resulting coating composition was spread upon a sheet of southern kraft liner weighing 42 lbs. per 1000 sq. ft., with a #18 wire wound Mayer coating bar, and dried for 5 minutes in an air oven at 210–220° F.

The coated sheet showed good coverage and opacity and was a brilliant metallic green color.

I claim as my invention:

1. A coating composition consisting essentially of, an equeous dispersion of a film forming binder, at least one colored pigment constituent having an average particle size between about 0.2 and about 2 microns in an amount sufficient to give the desired overall color effect, and metallic particles which are lamellar, nonleafing, and which have an equivalent covering power on water of less than 15,000 sq. cm. per gram and a grease content below about 1.5% by weight of said metallic particles, the ratio of the weight of the metallic particles, calculated as the weight of an equivalent volume of aluminum, to the weight of dry binder being in the range of about 1 to 100 to about 100 to 100.

2. A coating composition consisting essentially of, an aqueous dispersion of a film forming binder, at least one colored pigment, having an average particle size between about 0.2 to about 2 microns in an amount sufficient to give the desired overall color effect, and metallic particles selected from the group consisting of aluminum, copper, copper alloys, and mixtures thereof, said particles being lamellar and nonleafing, and said particles having an equivalent covering power on water of less than 15,000 sq. cm. per gram and a grease content below about 1.5% by weight of said metallic particles, the ratio of the weight of the metallic particles, calculated as the weight an equivalent volume of aluminum, to the weight of dry binder being in the range of about 1 to 100 to about 100 to 100.

3. A coating composition consisting essentially of, an aqueous dispersion of a film forming binder, at least one colored pigment constituent having an average particle size between about 0.2 to about 2 microns in an amount sufficient to give the desired overall color effect, and aluminum particles which are lamellar, nonleafing and which have an equivalent covering power on water of less than 15,000 sq. cm. per gram and a grease content below about 1.5% by weight of said metallic particles, the ratio of the weight of the aluminum particles to the weight of dry binder being in the range of about 1 to 100 to about 100 to 100.

4. A coating composition consisting essentially of, an aqueous dispersion of a film forming binder, at least one colored pigment constituent having an average particle size between about 0.2 to about 2 microns in an amount sufficient to give the desired overall color effect, and aluminum particles which are lamellar and nonleafing, and which have an equivalent covering power on water of less than 10,000 sq. cm. per gram and a grease content below about 1.5% by weight of said aluminum particles, and the ratio of the weight of the aluminum particles to the weight of dry binder being in the range of about 1 to 100 to about 100 to 100.

5. A coating composition consisting essentially of, an aqueous dispersion of a dispersing agent and at least one film forming binder selected from the group consisting of organic polymerizable materials, vulcanizable latecies, silicates, and protein solutions, and at least one colored pigment constituent having an average particle size between about 0.2 to about 2 microns in an amount sufficient to give the desired overall color effect, and metallic particles which are lamellar and nonleafing, and which have an equivalent covering power on water of less than 15,000 sq. cm. per gram and a grease content below about 1.5% by weight of said metallic particles, and the ratio of the weight of the metallic particles, calculated as the weight of an equivalent volume of aluminum, to the weight of dry binder being in the range of about 1 to 100 to about 100 to 100.

6. A coating composition consisting essentially of, an aqueous dispersion of a film forming binder, at least one colored pigment constituent having an average particle size between about 0.2 to about 2 microns in an amount sufficient to give the desired overall color effect, and copper particles which are lamellar and nonleafing and which have an equivalent covering power on water of less than 15,000 sq. cm. per gram, a grease content below about 1.5% by weight of said copper particles, and the ratio of the weight of the copper particles to the weight of dry binder being in the range of about 2 to 100 to about 150 to 100.

7. A paper product coated on its surface with the coating composition of claim 1.

8. A textile product coated on its surface with the coating composition of claim 1.

References Cited in the file of this patent

UNITED STATES PATENTS

| | | |
|---|---|---|
| 2,642,404 | Pike | June 16, 1953 |
| 2,649,383 | Killian et al. | Aug. 18, 1953 |
| 2,658,002 | Schwefsky | Nov. 3, 1953 |
| 2,662,027 | Pike | Dec. 8, 1953 |
| 2,709,689 | Herzog et al. | May 31, 1955 |
| 2,780,559 | Sahli | Feb. 5, 1957 |
| 2,786,821 | Gardner | Mar. 26, 1957 |
| 2,827,388 | Mayer et al. | Mar. 18, 1958 |
| 2,864,719 | Willis | Dec. 16, 1958 |

OTHER REFERENCES

Federation of Paint and Varnish Production Clubs, Official Digest, "New Aluminum Paste Pigments," by Robert I. Wray, Nos. 276–287, 1958, pages 441–446.